Patented Dec. 20, 1938

2,140,639

UNITED STATES PATENT OFFICE 2,140,639

METHOD OF PREPARING CELLULOSE ACETATE

Carl J. Malm and Loring W. Blanchard, Jr., Rochester, N. Y., assignors to Eastman Kodak Company, Rochester, N. Y., a corporation of New Jersey No Drawing. Application February 25, 1938, Serial No. 192,647

13 Claims. (Cl. 260—101)

This application relates to the preparation of cellulose acetate in which the cellulose is swelled with acetic acid and then treated with a mixture of acetic acid and part of the acetylation catalyst prior to its cooling to a low temperature and acetylating by adding acetic anhydride and further catalyst.

At the present time the use of cellulose acetate for purposes in which high clarity is desirable has made the preparation of cellulose acetate, having a high clarity and uniformity, of considerable interest.

An object of our invention is to prepare cellulose acetate of exceptional clarity and uniformity. Other objects will appear herein.

In the manufacture of cellulose acetate, the cellulose is ordinarily subjected to a pretreatment before the acetylation. The character of this pretreatment depends upon the conditions in the subsequent acetylation. If a small proportion of sulfuric acid is employed as the catalyst in the acetylation, the cellulose is usually treated with acetic acid containing the catalyst until the cuprammonium viscosity has been markedly lowered before the acetylation is induced by adding acetic anhydride thereto. If a larger proportion of sulfuric acid is to be employed in the esterification, the pretreatment usually consists in a treatment with acetic acid alone, the purpose of the pretreatment being merely to swell the cellulose fibers before the acetylation without decreasing the viscosity of the cellulose.

We have found that a cellulose acetate of exceptional clarity and uniformity can be produced if the cellulose is first swollen in acetic acid and then given a mild breakdown treatment with acetic acid containing a small amount of catalyst and finally acetylated with a mixture containing a larger amount of catalyst. By swelling the cellulose before the addition of the catalyst, the absorption of the catalyst is more even and the cellulose is broken down to a lesser but more uniform degree. By the addition of further catalyst at the beginning of the acetylation, a rapid introduction of acetyl groups at the lower temperature is possible and the cellulose is better protected from degradation during the acetylation than in an ordinary acetylation process. As usually carried out, the presoaking with the acetic acid is at higher temperature than the pretreatment with the addition of a small amount of catalyst. Also, it is desirable to render the mass substantially anhydrous after the second pretreatment and immediately prior to the acetylation proper. The water may be destroyed during the second pretreatment, however, the quality of the product obtained is not as good as when the water is destroyed by the addition of anhydride at a low temperature and immediately prior to the acetylation.

In the first pretreatment or the presoaking, sufficient lower fatty acid, such as acetic acid, should be employed to insure thorough soaking of the cellulose. If desired, the method of presoaking cellulose, described in Malm application Serial No. 168,966, may be employed, in which case only a small amount of acid need be used. In the presoaking treatment, it is preferred to carry out the swelling treatment at 100–150° F. A temperature within the range of 110–130° F. has been found to be usually suitable for this step. The minimum time, which is necessary to impart a swollen condition to the cellulose, depends on the temperature of treatment; with a higher temperature the time may be shorter. For instance, with a temperature of 130° F., satisfactory swelling may be obtained in approximately one hour, while with a temperature of 110° F., it is desirable to employ two hours to impart the desired amount of swelling. If the presoaking method, described in Malm application Serial No. 168,966, is employed, it is desirable to employ a longer time of treatment than where a large bulk of acetic acid is used. In this presoaking, the bath should be free of catalyst.

The amount of acetic acid employed in the second pretreatment depends somewhat on the amount of acid remaining from the first pretreatment. If a large proportion of acetic acid was employed in the presoaking, it is only necessary to use sufficient acid to dilute the catalyst before adding it to the cellulose. There should be sufficient acid present, however, to insure thorough soaking of the cellulose. The sulfuric acid present should be only a part of that which is to be employed in the subsequent esterification. It is preferred that the amount of catalyst be not more than approximately one-half that which will be employed in the esterification step. A proportion of sulfuric acid, between one and two per cent based on the cellulose, will ordinarily be found sufficient to give the proper amount of breakdown to make the cellulose readily and uniformly esterifiable. The temperature of the second pretreatment should preferably be not above approximately 100° F. If the degree of lowering of the cuprammonium viscosity of the cellulose is not particularly critical, the temperature may be even higher. If desired, the second pretreatment and the cooling of the mass down to the temperature to be employed at the beginning of the esterification may both be carried out at the same time, the cellulose being pretreated while it is being cooled. If this pretreatment and the cooling are not carried out simultaneously, one-half hour is the maximum time necessary to assure sufficient breakdown of the cellulose for a good esterification to occur. The conditions given above are suitable for use where the cellulose material, ordinarily used for esterification, is employed as the starting material. With some cellulose materials, it might well be that a longer or more severe pretreatment is desirable in order to prepare the cellulose for esterification.

The mass is cooled to a temperature sufficient to prevent esterification of the cellulose when sufficient anhydride is added to convert the water therein to acid. After the mass has been brought down to this temperature, an amount of anhydride is added which is approximately equivalent to the water contained in the mass. As the reaction between the anhydride and the water generates heat, it is desirable to again cool the mass prior to inducing the esterification by the addition of the remaining anhydride and the remaining catalyst. If the temperature is reduced to 65° F., the water combines with the anhydride without causing any noticeable esterification of the cellulose. The degree of cooling, prior to the esterification proper, depends on the ultimate acetylation temperature desired and the amount of catalyst which is used in the esterification. If a high viscosity product is to be prepared, the amount of catalyst will be greater and the degree of cooling will be lower. For instance, in Example 2, the mixture of acetic anhydride and catalyst was cooled to 20° F. before its addition in order to prevent a rise in temperature above 80° F. In Example 1, on the other hand, in which only about 4% of catalyst is employed, based on the weight of the cellulose, the cooling of the anhydride was unnecessary and the temperature was allowed to rise to 100° F. The resulting product in this case has a lower viscosity.

In the esterification it is unnecessary to use more than 3 parts of acetic anhydride for every part of cellulose. If the water in the mass has been previously destroyed, approximately 2 parts of acetic anhydride is sufficient to assure complete esterification of the cellulose. The necessary amount of catalyst to bring up the catalyst to full strength for esterification, is added in the form of a solution in the anhydride.

A typical process, in accordance with my invention, is one in which the cotton and a substantial amount of acetic acid is mixed together and held at 110° F., for 2 hours. The mixture is then cooled to 100° F. and 2000 cc. (per 500 lbs. of cellulose) of sulfuric acid (sp. gr. 1.84) dissolved in a small amount of acetic acid is added and the mass is kept at 100° F. for one-half hour. The mass is then cooled to 65° F. and one-half of the acetic anhydride, to be employed in the esterification, is added thereto. The water present is all destroyed causing a slight rise in temperature. The mass is then brought down to 60° F., whereupon the remainder of the anhydride and another 2000 cc. or more of sulfuric acid is added which induces esterification causing the temperature to rise to a maximum of 100° F. The time from the addition of the mixture of anhydride and catalyst to the completion of the esterification ordinarily takes 2–3 hours. The cellulose acetate is then hydrolyzed until an acetone-soluble product is obtained.

The following is typical of preparing cellulose acetate, in accordance with our invention, where the second pretreatment and the cooling are carried out simultaneously:

Cellulose is mixed with a large amount of acetic acid and allowed to stand for one hour at 130° F. Approximately 2000 cc. (based on 500 lbs. of cellulose) of sulfuric acid (sp. gr. 1.84) dissolved in a small amount of acetic acid is added and the mass is immediately cooled to a temperature of 65° F. The pretreatment is going simultaneously with the cooling and the rapidity of it is aided by the preliminary high temperature swelling of the cellulose. After the mass has been cooled down to 65° F., the elimination of the water and the esterification is carried out, as described. After the product is formed, it is preferably hydrolyzed to acetone solubility, such as by the addition of aqueous acetic acid and hydrolyzing.

The following examples illustrate processes which embody our invention:

*Example I*

500 lbs. of cellulose were treated with 2600 lbs. of acetic acid for one hour at 130° F. The mixture was cooled to 100° F. and 600 lbs. of acetic acid, containing 2000 cc. of sulfuric acid, was added. The mass was cooled until the temperature was at 65° F. or lower. A mixture of 1400 lbs. of acetic anhydride and 2000 cc. of sulfuric acid was then added and the esterification was carried out in such a manner that the maximum temperature reached did not exceed 100° F. The esterification was completed in 2 hours. The cellulose acetate formed was hydrolyzed by adding 700 lbs. of 50% acetic acid and subsequently holding the mass at 100° F. for 100 hours. The cellulose acetate was separated from the mass by precipitating, washing and drying. It was found that the product dissolved in acetone and other organic solvents to give solutions having extremely good clarity.

*Example II*

The procedure of Example I was repeated except that 6000 cc. of sulfuric acid was present in the last addition of anhydride. This acetic anhydride-sulfuric acid mixture was cooled to 20° F. before it was added to the mass. The conditions were controlled so that the maximum temperature reached in the esterification did not exceed 80° F. In 3 hours the cellulose had completely dissolved, showing completion of the esterification. The cellulose acetate formed was hydrolyzed by the addition of aqueous acetic acid and maintaining at 100° F. until acetone-solubility was attained. It was then precipitated, washed and dried. The cellulose acetate formed was very viscous but dissolved in acetone to form a solution of exceptional clarity.

Due to the clarity of the cellulose esters prepared in accordance with our invention, both in solution and in sheet form, they are exceptionally valuable in making products in which the transparency of the cellulose derivative is of value. For instance, a colloidized sheet of this ester may be employed in the making of laminated glass. These esters are also suitable for use in the making of photographic film base, particularly for motion picture purposes where the light is transmitted through the film. These esters, however, because of their brilliance, are also suitable for use in making synthetic yarn, lacquers or for various coating compositions. A plasticizer such as triphenyl phosphate may be employed with the ester if desired.

Other lower fatty acid esters of cellulose, such as cellulose acetate propionate or cellulose acetate butyrate, may be prepared in accordance with our invention, such as by incorporating propionic or butyric acid in one or both of the pretreating steps or by adding it with the anhydride at the start of the esterification. The esters prepared, in accordance with our invention, may be colloidized by the use of other solvents than acetone, such as a mixture of an alkylene chloride, particularly ethylene chloride with alcohol, or a mixture of an aromatic hydrocarbon, such as benzene with a lower aliphatic alcohol. The esterification temperature may be controlled by cooling the esterification vessel while the reaction is occurring. This, together with the cooling of the esterification mixture, initially results in preventing the rise in temperature above a point which will cause excessive lowering of the viscosity of the esterification. The care with which such control is exercised depends upon the criticalness of the viscosity of the cellulose ester which is being prepared.

Our invention is adapted for use in esterification processes in which the cellulose dissolves in the reaction mixture. The solvent, which is usually present, is acetic acid, although the presence of other solvents, such as ethylene or methylene chloride, therein would not ordinarily be objectionable. The acid, which is employed in the pretreatment steps, is ordinarily carried on into the esterification and forms part of the esterification bath. Although it would be possible to press out the pretreating acid and add further acid or other solvent, as desired, in the esterification, in the interest of economy it is preferred that all of the pretreating acid be carried over into the esterification. The presoaking bath, employed in the first step of our process, should be substantially free of catalyst, as otherwise the disadvantages, which are avoided by our process, would be present.

After separating the ester from its reaction mixture by precipitation, it is desirable to wash it counter-currently in the manner described and claimed in Clarke and Clarke Patent No. 2,036,397. The ester may also be stabilized in accordance with the method described in that patent, where necessary.

If desired, the ester prepared in accordance with our invention may be reduced to a minimum acetone viscosity by washing several times in distilled water, as described and claimed in Malm Patent Number 2,126,489 issued August 9, 1938. The resulting ester may be made into yarn such as by dissolving in acetone and spinning by forcing the solution through a spinneret into an evaporative atmosphere.

The viscosity of the ester prepared in accordance with our invention may be increased by washing with water containing a very small proportion of an alkaline earth metal salt, such as calcium carbonate, as described and claimed in Malm Patent Number 2,126,488 issued August 9, 1938.

Although our process is particularly intended for the acylation of refined cotton linters or refined sulfite wood pulp having a high alpha cellulose content, it may be employed on any esterifiable cellulose material. Due to the effectiveness of the preliminary treatment of our process, a better product will be obtained than by an ordinary acetylation process using the same type of cellulose as the starting material.

We claim:

1. The process of preparing a lower fatty acid ester of cellulose which comprises presoaking the cellulose in a catalyst-free bath essentially consisting of acetic acid, subsequently treating the cellulose with a mixture of acetic acid, and only a portion of the amount of catalyst to be employed in the esterification, and inducing esterification of the cellulose by adding acetic anhydride and the remainder of the catalyst to the mass.

2. The method of preparing a lower fatty acid ester of cellulose which comprises presoaking the cellulose with a catalyst-free liquid essentially consisting of acetic acid at a temperature of 100–150° F. until the cellulose is swollen, pretreating the swollen cellulose with a mixture of acetic acid and 1–2% of sulfuric acid based on the weight of the cellulose, and subsequently esterifying the cellulose by adding acetic anhydride and additional catalyst to the mass.

3. The process of preparing cellulose acetate which comprises presoaking the cellulose in a catalyst-free bath essentially consisting of acetic acid, subsequently treating the cellulose with a mixture of acetic acid and only a portion of the amount of catalyst to be employed in the esterification, and inducing esterification of the cellulose by adding acetic anhydride and the remainder of the catalyst to the mass.

4. The method of preparing cellulose acetate which comprises presoaking the cellulose with a catalyst-free liquid essentially consisting of acetic acid at a temperature of 100–150° F. until the cellulose is swollen, pretreating the swollen cellulose with a mixture of acetic acid and 1–2% of sulfuric acid based on the weight of the cellulose, and subsequently esterifying the cellulose by adding acetic anhydride and additional catalyst to the mass.

5. In the process of preparing a lower fatty acid ester of cellulose in which the cellulose is pretreated and then acetic anhydride is added to esterify the cellulose in the presence of an acylation catalyst, the pretreatment of the cellulose which comprises soaking it in at least an equal quantity of a catalyst-free bath essentially consisting of acetic acid and then treating it at a lowered temperature with a mixture of acetic acid and a small amount of an acylation catalyst.

6. In the process of preparing a lower fatty acid ester of cellulose in which the cellulose is pretreated and then acetic anhydride is added to esterify the cellulose in the presence of an acylation catalyst, the pretreatment of the cellulose which comprises soaking it in at least an equal quantity of a catalyst-free bath essentially consisting of acetic acid and then treating it at a lowered temperature with a mixture of acetic acid and a small amount of sulfuric acid.

7. The process of preparing a lower fatty acid ester of cellulose which comprises presoaking the cellulose in a catalyst-free bath essentially consisting of acetic acid at a temperature of 110–130° F. for a sufficient time to swell the cellulose, activating the cellulose with a mixture of acetic acid and a portion of the catalyst to be employed in the esterification at a temperature below that employed in the presoaking step, and inducing esterification of the cellulose by adding acetic anhydride and further acylation catalyst to the mass.

8. The process of preparing a lower fatty acid ester of cellulose which comprises presoaking the cellulose in a catalyst-free bath essentially consisting of acetic acid at a temperature of 110–130° F. for a sufficient time to swell the cellulose, activating the cellulose at a temperature below that employed in the presoaking step with a mixture of acetic acid and a portion of sulfuric acid catalyst which is to be employed in the esterification, and inducing esterification of the cellulose by adding acetic anhydride and further sulfuric acid to the mass.

9. The process of preparing a lower fatty acid ester of cellulose which comprises presoaking the cellulose in a catalyst-free bath essentially consisting of acetic acid at a temperature of 110°–130° F. for a sufficient time to swell the cellulose, activating the cellulose at a temperature below that employed in the presoaking step, with a mixture of acetic acid and a portion of the catalyst to be employed in the esterification, cooling the mass to below room temperature, adding acetic anhydride whereby the moisture present is destroyed, again cooling to below room temperature, if necessary, and inducing esterification by adding acetic anhydride and further acylation catalyst to the mass.

10. The process of preparing cellulose acetate which comprises presoaking the cellulose in an excess of acetic acid at approximately 130° F. for a sufficient time to swell the cellulose, activating the cellulose at a lowered temperature with a mixture of acetic acid and 1–2% of sulfuric acid, based on the weight of the cellulose, treating the mass at below room temperature with acetic anhydride to rid it of moisture and inducing esterification by adding thereto a mixture of acetic anhydride and 1–2% of sulfuric acid, based on the weight of the cellulose.

11. The process of preparing cellulose acetate which comprises presoaking the cellulose in an excess of acetic acid at approximately 130° F. for a sufficient time to swell the cellulose, activating the cellulose at a lowered temperature with a mixture of acetic acid and 1–2% of sulfuric acid, based on the weight of the cellulose, treating the mass at below room temperature with acetic anhydride to rid it of moisture and inducing esterification by adding a mixture of acetic anhydride and 5% of sulfuric acid, based on the weight of the cellulose thereto.

12. The process of preparing cellulose acetate which comprises presoaking the cellulose in an excess of acetic acid for about two hours at 110° F., activating the cellulose with a mixture of acetic acid and 1–2% of sulfuric acid, based on the weight of the cellulose, for approximately one-half hour at 100° F., cooling to 65° F. and adding a portion of the acetic anhydride to be employed in the esterification, cooling to 60° F. and adding acetic anhydride and 1–2% of sulfuric acid, based on the weight of the cellulose, to induce the acetylation of the cellulose, the temperature of which is allowed to rise above 100° F.

13. The process of preparing cellulose acetate which comprises presoaking the cellulose with a large amount of acetic acid at 130° F. for approximately one hour, adding a mixture of acetic acid and 1–2% of sulfuric acid thereto, cooling the mass to approximately 65° F., adding sufficient acetic anhydride to rid the mass of the moisture present therein, cooling to approximately 60° F. and adding a mixture of acetic anhydride and acylation catalyst to induce the acetylation of the cellulose and allowing the temperature in the esterification to rise no higher than 80–100° F.

CARL J. MALM.
LORING W. BLANCHARD, Jr.